(12) United States Patent
Stubenrauch et al.

(10) Patent No.: US 8,961,021 B2
(45) Date of Patent: Feb. 24, 2015

(54) ROLLER BODY FOR ROLLER BEARING

(75) Inventors: Arno Stubenrauch, Aidhausen (DE);
Armin Olschewski, Schweinfurt (DE);
Alexander de Vries, Tiel (NL);
Sebastian Ziegler, Utrecht (NL); Goran Christiansson, Soest (NL); Eugene Sigal, The Hague (NL); Frank de Wit, Noordeloos (NL); Hendrik Mol, Sleeuwijk (NL)

(73) Assignee: Aktiebolaget SKF, Gothenburg (SE)

( * ) Notice: Subject to any disclaimer, the term of this patent is extended or adjusted under 35 U.S.C. 154(b) by 553 days.

(21) Appl. No.: 13/189,824

(22) Filed: Jul. 25, 2011

(65) Prior Publication Data
US 2012/0020603 A1  Jan. 26, 2012

(30) Foreign Application Priority Data

Jul. 26, 2010  (DE) .......................... 10 2010 038 393

(51) Int. Cl.
*F16C 41/00* (2006.01)
*F16C 19/52* (2006.01)
*F16C 33/34* (2006.01)
*F16C 33/36* (2006.01)

(52) U.S. Cl.
CPC ............. *F16C 19/522* (2013.01); *F16C 41/008* (2013.01); *F16C 33/34* (2013.01); *F16C 33/366* (2013.01)

USPC ........................................................ 384/448

(58) Field of Classification Search
CPC .... F16C 19/522; F16C 19/525; F16C 19/527; G01L 5/0009
USPC ............. 384/448, 624; 324/173–174, 207.15, 324/207.22, 207.25; 73/862.322, 862.627, 73/862.49, 862.54
See application file for complete search history.

(56) References Cited

U.S. PATENT DOCUMENTS

| | | | |
|---|---|---|---|
| 4,175,430 A | | 11/1979 | Morrison et al. |
| 5,503,030 A | * | 4/1996 | Bankestrom .............. 73/862.627 |
| 2010/0102801 A1 | * | 4/2010 | Takahashi et al. ........ 324/207.25 |

FOREIGN PATENT DOCUMENTS

| | | |
|---|---|---|
| DE | 2218047 A1 | 11/1972 |
| DE | 69412390 T2 | 10/1999 |
| DE | 69828236 T2 | 12/2005 |
| DE | 102006051642 A1 | 5/2008 |
| DE | 102007020938 B3 | 12/2008 |
| DE | 102007020940 B3 | 12/2008 |
| DE | 112007001902 T5 | 7/2009 |

* cited by examiner

*Primary Examiner* — Phillip A Johnson
(74) *Attorney, Agent, or Firm* — Bryan Peckjian; SKF USA Inc. Patent Depart.

(57) ABSTRACT

A roller body for a roller bearing includes at least one cavity extending from an end face of the roller body, at least one retaining element is disposed in the cavity, and at least one sensor is disposed in the cavity, such as in or on the retaining element. The sensor is at least partially surrounded by an elastic material in a protective manner.

26 Claims, 8 Drawing Sheets

ROLLER BODY FOR ROLLER BEARING

CROSS-REFERENCE

This application claims priority to German patent application no. 10 2010 038 393.7 filed on Jul. 26, 2010, the contents of which are incorporated by reference as if fully set forth herein.

TECHNICAL FIELD

The present invention relates to roller bodies for roller bearings.

BACKGROUND

During operation of a roller bearing, relative rotational movement between two bearing rings is supported by a rotating and/or circulating movement of roller bodies disposed between the bearing rings. Cylindrical roller bearings or tapered roller bearings are typically utilized to support larger loads, e.g., in wind turbines or motor vehicles and in the heavy machinery industry. Cylindrical roller bodies have a cylindrical shape overall and tapered roller bodies have a truncated cone shape overall. Particularly large radial loads can be supported by cylindrical roller bearings, whereas tapered roller bearings can support axial loads in addition to radial loads.

During operation, roller bearings are often exposed to a variety of external influences that may negatively affect their operating behavior and/or service life. In many situations, such negative external influences can lead to an overload of the components of the roller bearing, which may result in a premature breakdown (failure) or a reduced service life. One representative negative external influence is, e.g., oscillations or vibrations of a drive train that is supported by the bearing, which can lead to a temporary skewing or tilting of the bearing components relative to one another. This may cause a temporary overload on the roller bodies and/or on the tracks of the bearing rings, on which the roller bodies roll. In addition, recurring imbalances in housing or structural elements, which are supported by the bearing, can lead to elastic deformation of the roller bodies and bearing rings. Moreover, if the external conditions change, the roller bearing may become loaded outside of its specification, in case the roller bearings were not correctly designed or selected for the excessive external conditions, such as e.g., excessive external temperatures. Even under normal operating conditions, the roller bodies occasionally deviate from their intended path, tilt or spin excessively when exiting the loaded portion of the bearing, which can result in, among other things, high radial accelerations. These and other damage mechanisms can lead to a premature breakdown of the roller bearings.

In order to counteract the premature breakdown, in particular, of larger and highly loaded roller bearings, it is possible, e.g., to design the bearing for a significantly higher peak load than is expected in normal operation. However, this may result in increased material and manufacturing costs. Moreover, while it is also possible to frequently inspect the roller bodies, this results in higher labor costs.

SUMMARY

It is the object of the present teachings to disclose an improved roller body, e.g., in which one or more of the above-mentioned disadvantages is/are effectively prevented or at least reduced.

In one aspect of the present teachings, a roller body for a roller bearing may include the following features:
- at least one cavity extending from an end side of the roller body,
- at least one retaining element disposed in or on the cavity,
- at least one sensor unit disposed on or in the retaining element and
- a first elastic material at least partially surrounding or enclosing the sensor unit in a protective manner.

According to this aspect of the present teachings, one or more sensor units is/are provided inside the roller body, which enables one or more operating conditions to be checked and/or monitored for one or more external influences. The roller body can be, e.g., a cylindrical roller, a self-aligning or spherical roller or a tapered roller, although the present teachings are not limited in this regard. The sensor unit can be configured, e.g., to measure one or more of temperature, load, strain, deviations or tilting of the roller body (ies), the quality or condition of lubricant that is in contact with the roller body, acceleration and/or vibration.

Depending on the intended application of the roller bearing and the negative external influences expected thereby, one or more sensor types and/or elements can be provided in the sensor unit. By analyzing the data detected by the sensor(s), it is possible to ascertain changes in the operating performance or behavior of the roller bearing so that preemptive action can be taken with respect to the expected or likely causes of failure and the roller bearing can be timely serviced before a breakdown. For instance, by continuously measuring of the quality or condition of the lubricant, the timing for replacing the lubricant can be optimally selected, since real-time data are used and it is not necessary to rely upon empirical data, e.g., an averaged bearing load, e.g., for scheduling the replacement of the lubricant.

In embodiments, in which the roller body temperature is measured and recorded, it can be readily determined whether the temperature of the bearing is within a specified range and therefore whether the most appropriate lubricant (i.e. suitable for the actual temperature being experienced by the bearing) was selected. Moreover, if the temperature changes so as to fall outside of the bearing's specification, the lubricant can be replaced with a more appropriate lubricant, if necessary. By replacing and/or servicing the bearing in a timely manner without allowing it to break down, the idle time of the corresponding machine is reduced and the service can be planned more appropriately.

When a lubricant is used, the roller body(ies) may be contaminated with dirt during operation of the roller bearing. In this case, it may be appropriate to protect the sensor unit(s) from this negative external influence, i.e. contamination. Thus, in another aspect of the present teachings, the sensor unit may be at least partially embedded in and/or surrounded by a protective material, such as a plastic material, more preferably an elastic material. The protective material may be e.g., a polymer, more preferably an elastomer and/or rubber. In this way, especially sensitive parts of the sensor unit can be efficiently protected from negative external influences.

In another aspect of the present teachings, the retaining element has at least one recess and the sensor unit(s) is/are held or retained in the recess(es). In this embodiment, the sensor unit(s) can be protected in a particularly efficient manner if, e.g., elastic material at least partially fills the recess(es).

In another aspect of the present teachings, a second elastic material is provided in the cavity and/or recess and also at least partially encloses or surrounds the retaining element. If a cavity is formed in a roller body, the roller body will have a thinner material thickness than a solid roller body having the same outer dimensions. This reduced thickness may lead to an increased vulnerability to vibrations and/or oscillations, which, in turn, may reduce the maximum load capacity of the roller body in comparison with a solid embodiment. However, by filling the cavity with an elastic material, vibrations can be efficiently dampened, so that this disadvantage of the hollow roller body is also compensated. The second elastic material can belong to the same material class as the first elastic material, but it may have one or more different properties, e.g., such as a different elastic modulus.

In another aspect of the present teachings, the sensor unit (s) may comprise at least one signal transmitting element, e.g., a wireless signal transmitting element. The signal transmitting element is connected with the sensor element(s) contained in the sensor unit(s) and serves to transmit measured data detected by the sensor element(s) to a data processing unit disposed outside of the roller bearing. The measured data from the sensor element(s) can be monitored there in real time e.g., in order to initiate an emergency shutdown of the system in the event of an imminent (predicted) bearing failure. If the data processing unit is utilized, it can be configured to show a trace of the measured data during operation in order to visualize the temporal progression of the measured data such as, e.g., the changing of the load experienced by the roller body and/or the ambient temperature. The signal transmitting element preferably includes an antenna unit configured to wirelessly transmit the measured data, e.g., using a well-known technology, such as WLAN (e.g., WiFi), Bluetooth, RFID technology, other known radio communication technologies, etc. For this purpose, the sensor unit will include an electronic circuit that contains the necessary circuitry for processing and/or transmitting the measured data, as is well known in the art.

The measured data may be transmitted to the external data processing unit either as raw data, as partially processed data or as fully processed data. Thus, the roller body may also include a controller, such as a microprocessor and memory, configured to at least partially process the measured data prior to transmission to the external data processing unit, which may be e.g., a general purpose computer configured to perform the necessary calculations and/or output useful data, and/or a special-purpose computing device that is dedicated for communications and operations with the roller bodies.

In another aspect of the present teachings, the roller body may further include the following additional features:
- a second cavity extending from another end face of the roller body,
- an intermediate portion disposed between the cavities and being comprised of the same material as the roller body,
- a passage defined in the intermediate portion, the passage being connected with the retaining element, and
- an attachment element is disposed, at least partially, in the passage.

In this aspect of the present teachings, a good mechanical contact of the retaining element to the material of the roller body can be provided by using the attachment element. In this case, e.g., vibrations, which occur in the roller body and which are to be measured, are transmitted through the material of the roller body to the retaining element and to the sensor element(s) disposed on or in the retaining element. The same applies, e.g., to a temperature sensor.

In another aspect of the present teachings, a second retaining element is disposed in the second cavity and a power supply unit is retained in or on the second retaining element. The power supply unit is connected with or is in electrical communication with the sensor unit. The active and power consuming elements, e.g., the sensor unit(s), of the roller body can be supplied with electrical energy by the power supply unit, which may be, e.g., a battery or accumulator. Furthermore, by disposing the power supply unit in a retaining element of the second cavity, a better balanced roller body results.

In another aspect of the present teachings, the second retaining element may also be connected with the attachment element. In addition or in the alternative, an elastic material may also be disposed in the second cavity, e.g., to dampen oscillations and/or otherwise protect the sensitive component (s) in the second cavity. For example, the elastic material may protect both the power supply unit and the second retaining element from external influences. It is also possible to protect the power supply unit from external influences by using a separate (second) elastic material. In addition, it is possible to dispose one or more sensor units in the second cavity in a manner analogous to the first sensor unit(s).

In another aspect of the present teachings, roller bearings are provided that include at least one of the roller bodies according to the present teachings. The roller bearing can be, e.g., a cylindrical bearing, self-aligning roller, spherical roller or tapered roller. It is likewise possible to provide a plurality of the present roller bodies in a single roller bearing. In this case, different sensors could be placed in the roller bearing in the different roller bodies having sensor units and the different sensors may detect different measured data. It is likewise possible to dispose a plurality of types of sensors in a single roller body according to the present teachings, or to dispose a plurality of roller bodies having the same type of sensor unit in a single roller bearing.

Further objects, advantages, and embodiments of the present teachings will be understood by the person of ordinary skill in the art after reviewing the exemplary embodiments described in the following in connection with the accompanying figures as well as the appended claims.

DETAILED DESCRIPTION OF THE EMBODIMENTS

As an initial matter, it is noted that the exemplary embodiments described in the following relate to cylindrical or tapered rollers. However, other roller types, such as but not limited to self-aligning or spherical rollers, can also be constructed or configured in a corresponding manner and are considered to be within the scope of the present teachings.

Figure 1:
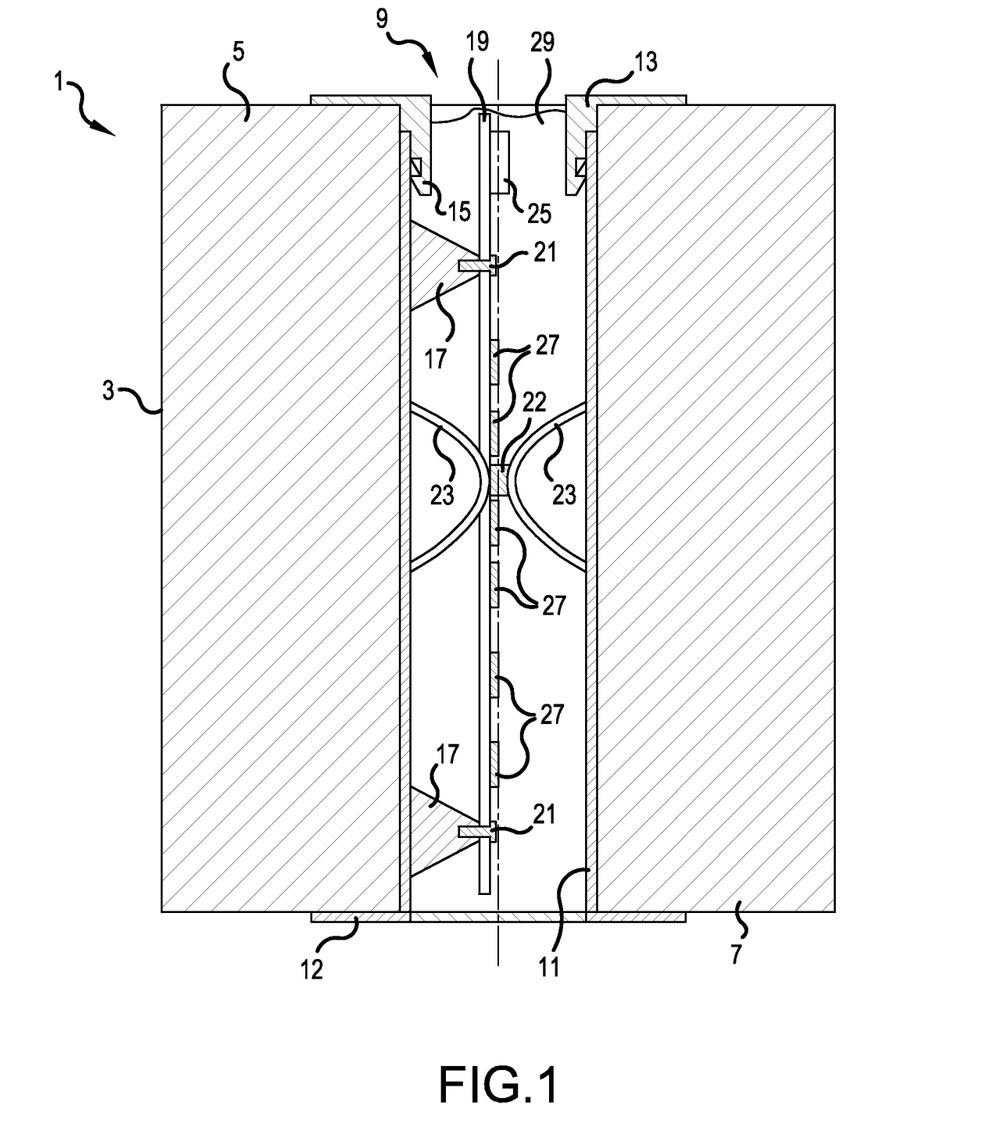
FIG. 1 shows a roller body according to a first embodiment of the present teachings in the form of a cylindrical roller.

Referring to FIG. 1, a first representative cylindrical roller 1 includes a radially-encircling track or race surface 3, via which the cylindrical roller 1 is in rolling contact with a not-illustrated inner ring or an outer ring of a roller bearing. In addition, the cylindrical roller 1 includes two end faces 5 and 7 that have, in essence, a circular base shape. A bore 9 extends between the end faces 5 and 7 and is disposed centrally in the cylindrical roller 1. A retainer 11 is disposed in the bore 9 and also has a hollow-cylindrical shape. The outer diameter of the retainer 11 corresponds to the inner diameter of the bore 9.

One end of the retainer 11 includes a circular stabilizing plate 12 for securely attaching the retainer 11 in the bore 9. On the opposite end, the retainer 11 is connected with a retaining piece 13, which includes snap-on elements 15. The snap-on elements 15 are in operative contact with corresponding counterparts of the retainer 11 such that the retainer 11 is axially affixed in the cylindrical roller 1. The inner surface of the retainer 11 includes two retainer holders 17. A circuit board 19 is attached to the retainer holders 17 via two screws 21. At least one sensor 22 is disposed on the circuit board 19. The sensor 22 includes two projections 23 that are in operative contact with the inner surface of the retainer 11.

Due to the fixed connection of the cylindrical roller 1 with the retainer 11, vibrations of the cylindrical roller 1 are transmitted to the projections 23 and thus to the sensor 22, where they are detected. The sensor type in the exemplary embodiment of the FIG. 1 is chosen merely as an example. In addition or in the alternative, a temperature sensor and/or another type of sensor, as was described above or below, can be provided in the present exemplary embodiment.

An antenna 25 is disposed on the circuit board 19 and is in wireless communication with a not-illustrated, external data processing unit. The circuit board 19 comprises known electronic components 27, which are illustrated herein only schematically. They serve, e.g., to detect and process the signal data generated by the sensor 22, control the antenna 25 and transmit the data. The electronic components 27 may include a processor, a memory and/or storage for storing measured data, as well as any control program(s) and/or operating parameters for the circuit board 19.

The interior of the retainer 11 is filled with a plastic 29 in order to protect the circuit board 19 and the sensitive electronic components provided thereon. In this embodiment, the plastic 29 completely surrounds all the electronic components 27 and the circuit board 19. In addition, the plastic 29 also serves to dampen vibrations of the roller body 1. For example, silicone, polyurethane and/or epoxide resin can be used as the plastic 29. Other polymers can be generally used instead of the plastic 29. When selecting an appropriate plastic 29, it is important to consider, among other things, the intended application, e.g., with regard to resistance to external influences, such as e.g., temperature, vibrations, stress and/or strain, the lubricant utilized and/or moisture.

Figure 2:
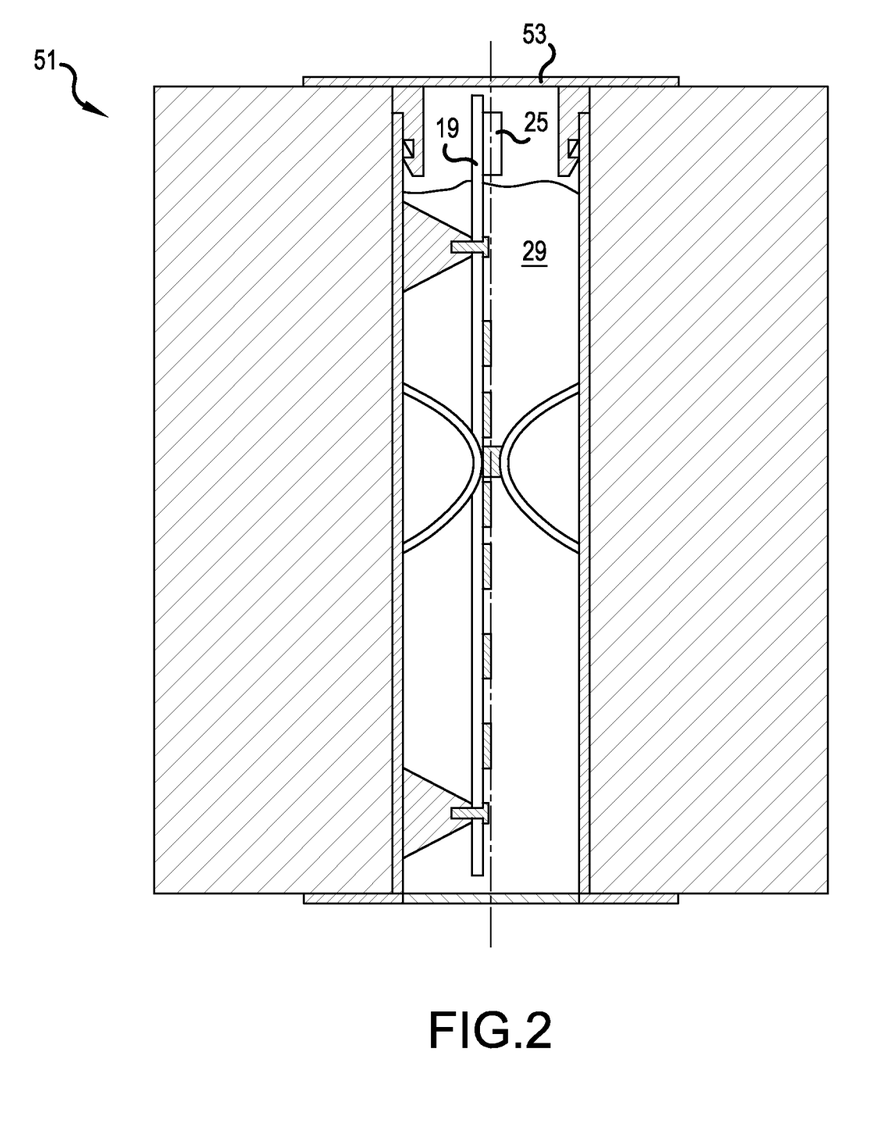
FIG. 2 shows a roller body according to a second embodiment of the present teachings in the form of a cylindrical roller.

The cylindrical roller 51 illustrated in FIG. 2 substantially corresponds to the cylindrical roller 1 illustrated in the FIG. 1. However, it differs in that the identically formed circuit board 19 is not entirely surrounded by the plastic 29. Instead, the portion of the circuit board, in or on which the antenna 25 is disposed, is not enclosed by plastic 29. This means that the radiated signal emitted by the antenna 25 for transmitting the data will not be attenuated by the surrounding plastic 29. Therefore, this embodiment may enable the antenna circuitry to operate at a lower transmission power and therefore lower energy consumption. To protect the antenna 25 from external influences and contamination, the retainer piece 53 is designed in a closed manner as a cover for the cylindrical roller 51 and is installed after the hollow interior space has been filled with the various components 19, 23, etc. and the plastic 29.

In the exemplary embodiments of the FIGS. 1 and 2, an internal power supply for the electrically active components is not provided inside the roller body 1, 51. Instead, it is understood that the circuit board 19 and its active components will be supplied with electric power utilizing known "Power Harvesting" techniques, such as inductive transmission or coupling of energy, preferably resonant induction coupling, and an externally-disposed power source. In such embodiments, an induction coil may be provided in the bore 9 of the roller body 1, 51 to take or absorb energy from a proximal, oscillating electromagnetic field (magnetic flux) and store the energy acquired therefrom in an intermediate storage device, such as a capacitor or accumulator. Such techniques are well known in the radio frequency identification (RFID) field and may be advantageously utilized with the present teachings in order to eliminate the need for an active power source inside of the bore 9 of the roller body 1, 51. Of course, in the alternative, it is also possible to provide a battery or the like in the bore 9 and/or on the circuit board 19.

Naturally, the above-described Power Harvesting techniques may be advantageously utilized with any of the embodiments, described above or below, of the present teachings.

Figure 3:
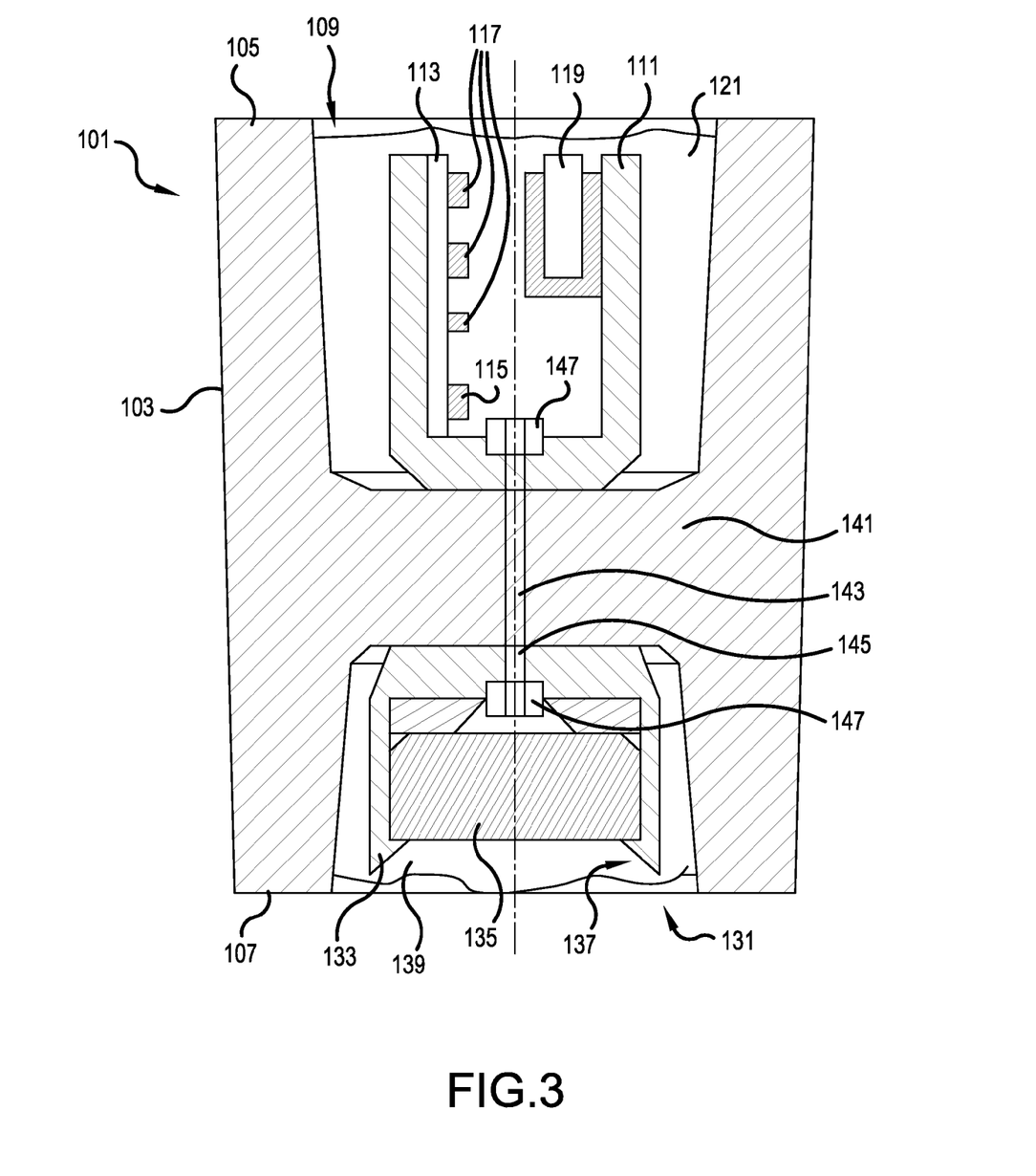
FIG. 3 shows a roller body according to a third embodiment of the present teachings in the form of a tapered roller.

A tapered roller 101 is illustrated in the FIG. 3 as another exemplary embodiment of the present teachings. The tapered roller 101 is provided e.g., for use in a tapered roller bearing. It has a track or race surface 103 that is in roller contact with corresponding tracks of bearing rings when inserted into a tapered roller bearing. In addition, the tapered roller 101 has two end faces 105 and 107 that differ in diameter due to the truncated cone shape.

The tapered roller 101 has a bore 109 extending from the end face 105. A pot-shaped retainer 111 is disposed in the bore 109. A circuit board 113 is attached in the retainer 111 and a sensor 115 is affixed to the circuit board 113. Likewise, various electronic components 117 are provided on the circuit board 113. An antenna 119 is attached in the retainer 111 opposite to the circuit board 113 and is electrically connected with the electronic components 117. The antenna 119 serves to wirelessly transmit signals representative of the measured data generated by the sensor 115, or partially or fully processed data corresponding to the measured data. The bore 109 is filled with an elastic material 121 that protects the electrically active components disposed in or on the retainer 111. At the same time, the elastic material 121 also may optionally serve to dampen oscillations of the tapered roller 101 due to its elastic properties.

A second bore 131 is formed in the tapered roller 101 and extends from the end face 107. A retainer 133 is disposed in the second bore 131 and a battery 135 is held in the retainer 133. The retainer 133 includes snap-on elements 137 that hold the battery in or on the retainer 133. Similar to the bore 109, the second bore 131 is also filled with an elastic material 139 for dampening vibrations and protecting the battery 135. An intermediate portion 141 of the roller body 101 lies between the bores 109 and 131. The intermediate portion 141 is comprised of the same material as the rest of the tapered roller 101, e.g., a bearing steel. By providing the intermediate portion 141, the tapered roller 101 will exhibit an increased stability in comparison to a corresponding tapered roller having a through bore that is equal in diameter to the bores 109 and 131.

A third bore 143 is formed in the intermediate portion 141 and connects the two bores 109 and 131. A screw 145 extends through the bore 143. The screw 145 serves to attach the retainer 111 and 133 to the tapered roller 101. For this purpose, it includes a nuts 147 on each end sides. The retainers 111 and 133 are fixedly connected with the body of the tapered roller 101 by the two respective nuts 147. The screw 145 has a hollow interior that provides a passage for an electric connection between the battery 135 and the circuit board 113. Therefore, the active electrical components disposed in the bore 109 can be supplied with electrical energy from the battery 135 disposed in the second bore 131.

Figure 4:
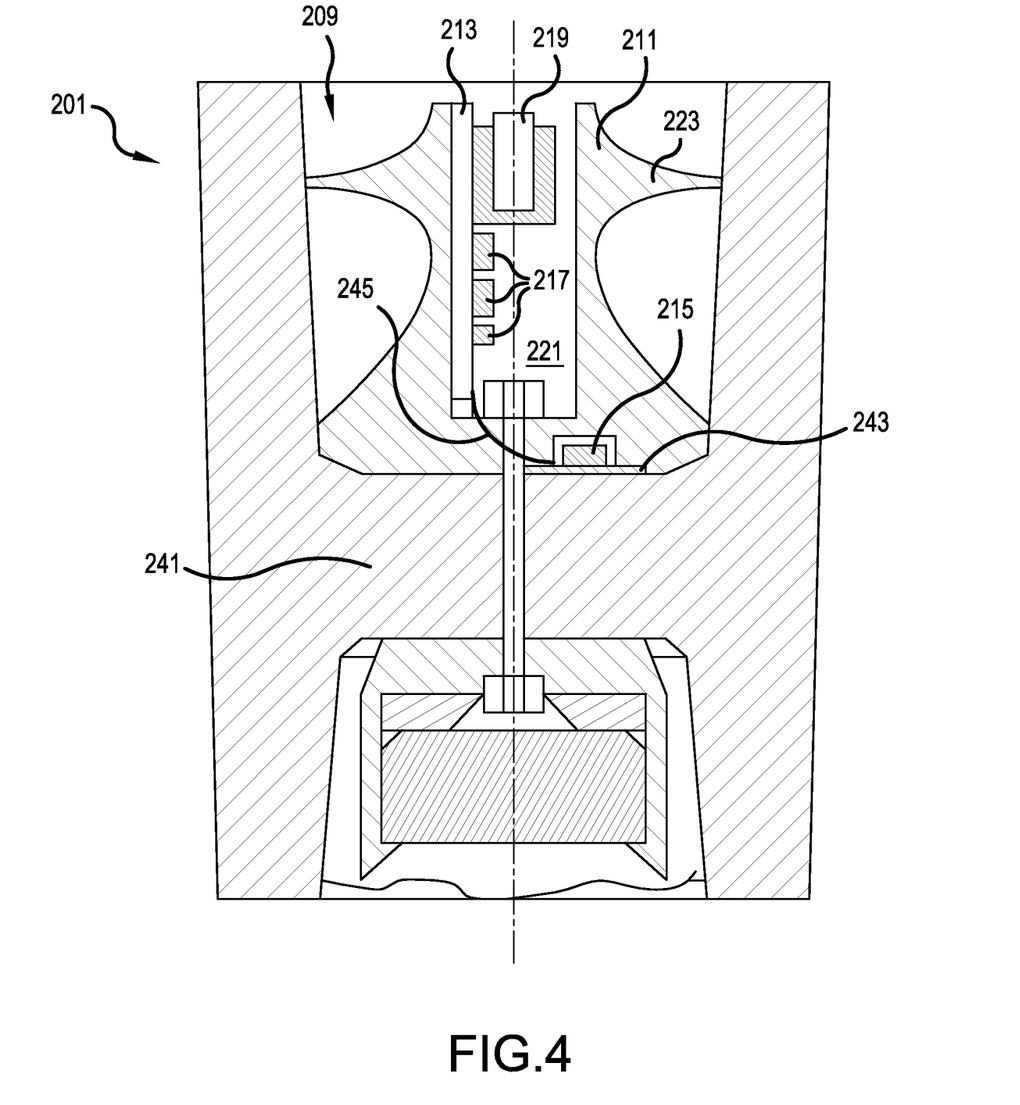
FIG. 4 shows a roller body according to a fourth embodiment of the present teachings in the form of a tapered roller.

The design of the tapered roller 201 illustrated in FIG. 4 corresponds for the most part to the tapered roller 101 illustrated in FIG. 3. That is, analogous to the exemplary embodiment of the FIG. 3, a retainer 211 is disposed in a bore 209 and has an opening, in which a circuit board 231 with electronic components 217 is disposed. However, in this exemplary embodiment, an antenna 219 is disposed directly on the circuit board 213. The hollow volume inside the retainer 211 is at least partially filled with a plastic 221 that protects the electronic components 217. In this exemplary embodiment, the bore 209 is not filled with an elastic material for dampening vibrations of the tapered roller 201. Instead, an axial end portion of the retainer 211 includes a radially-encircling protrusion 223 that contacts the inner wall of the bore 209 and dampens the vibrations of the tapered roller 201. The axially opposite end portion of the retainer 211 is formed so as to at least generally correspond to the shape of the bore 209. This design of the retainer 211 increases the overall stability of the assembly.

Similar to the tapered roller 101, the tapered roller 201 also includes an intermediate portion 241 that is comprised of the same base material as the tapered roller 201. A circuit board 243 is disposed directly on an axial end face of the intermediate portion 241 in the bore 209. A sensor 215 may be located on or in the circuit board 243. In this exemplary embodiment, the sensor 215 may be designed as a vibration sensor. Due to the direct contact of the sensor 215 on the circuit board 243 and on the intermediate portion 241, even weak vibrations of the tapered roller 201 can be reliably measured. The circuit board 243 is connected with the circuit board 213 via an electrical connection wire 245. The data detected by the sensor 215 can be thus transmitted via the connection wire 245 to the electronic components for further processing and transmission via the antenna 219.

Figure 5:
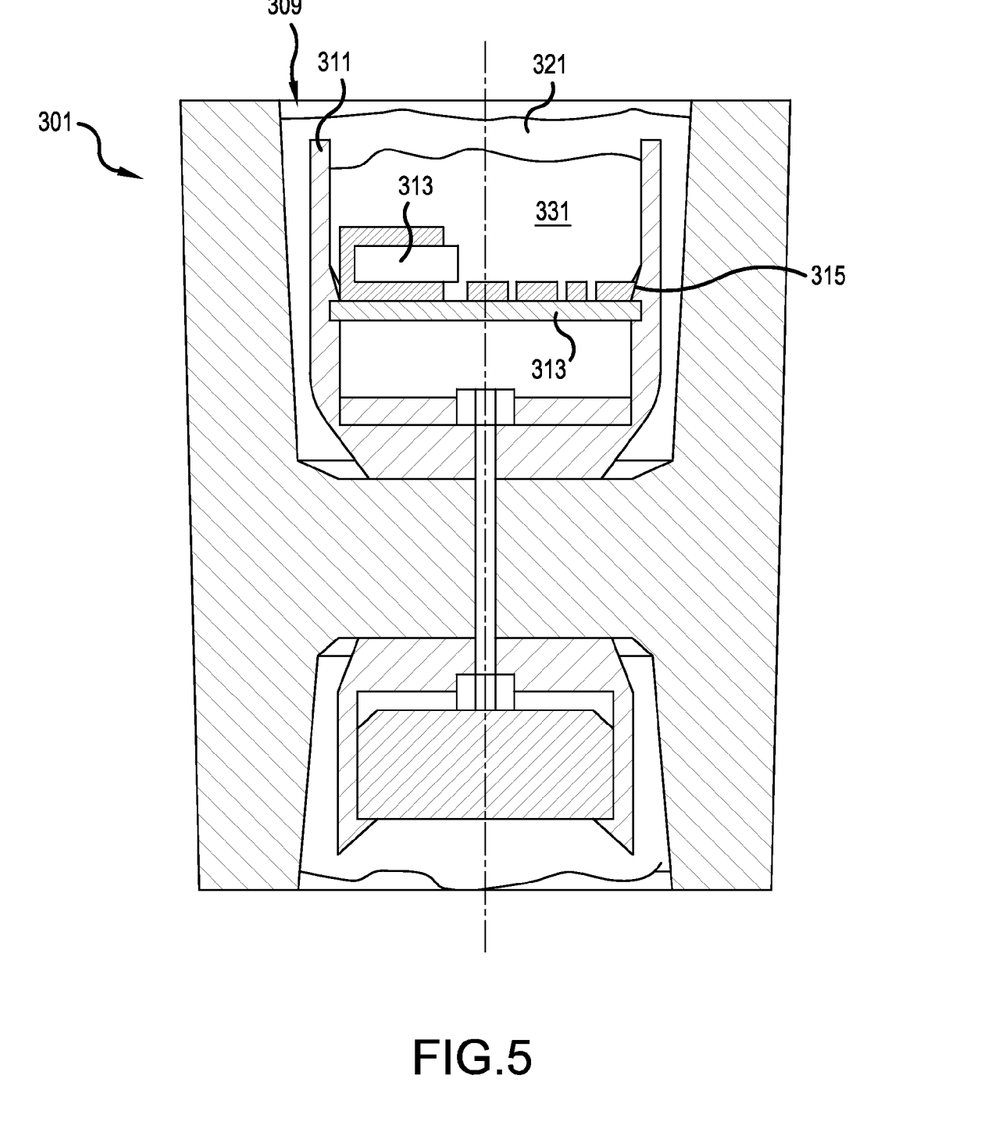
FIG. 5 shows a roller body according to a fifth embodiment of the present teachings in the form of a tapered roller.

The tapered roller 301 illustrated in the FIG. 5 also substantially corresponds to the exemplary embodiment of the FIG. 3. However, in contrast to the exemplary embodiment of the FIG. 3, the antenna 319 is disposed on the circuit board 313 and the circuit board 313 is attached to the retainer 311 by two snap-on elements 315. Moreover, the hollow portion of the retainer 311, which contains the circuit board 313, is filled with a protective plastic 331. The plastic 331 almost entirely surrounds the circuit board 313 and protects it from damaging external influences. The retainer 311 is attached to a portion of the bore 309 of the tapered roller 301 and the bore 309 is filled with an elastic material 321. The elastic material 321 preferably exhibits a significantly higher elasticity than the plastic 331, which fills the retainer 311 for protecting the circuit board 313. The dampening of the vibrations of the tapered roller 301 and the protection of the circuit board 313 are thus ensured by two optimized materials.

Figure 6:
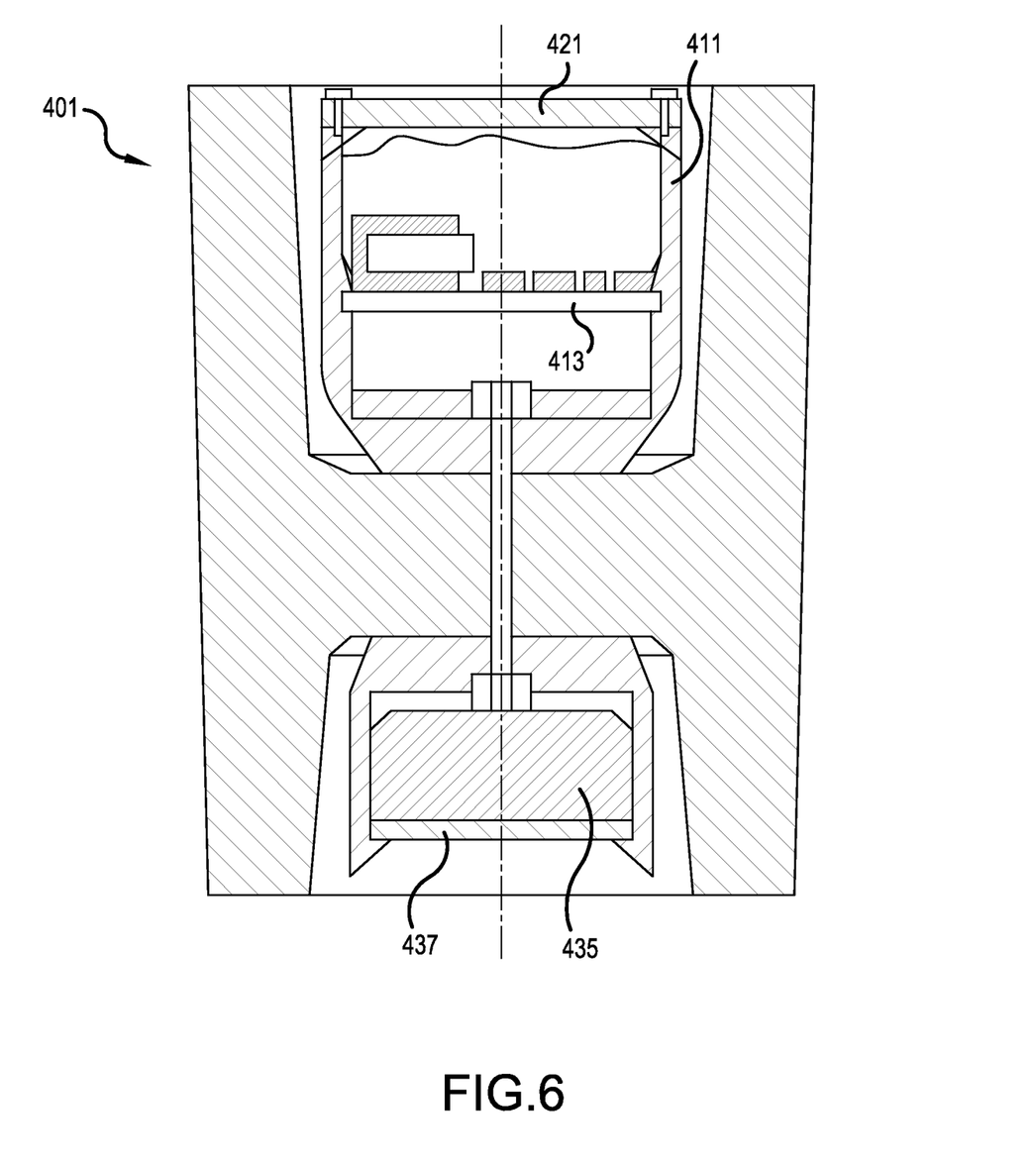
FIG. 6 shows a roller body according to a sixth embodiment of the present teachings in the form of a tapered roller.

The tapered roller 401 illustrated in the FIG. 6 substantially corresponds to the exemplary embodiment of the FIG. 5. However, in contrast to the exemplary embodiment of the FIG. 5, the retainer 411 is closed by a screwed-on cover 421. Therefore, the protection of the circuit board 413 is further increased. The same applies to the battery 435, which is likewise protected from external influences by a cover 437.

Figure 7:
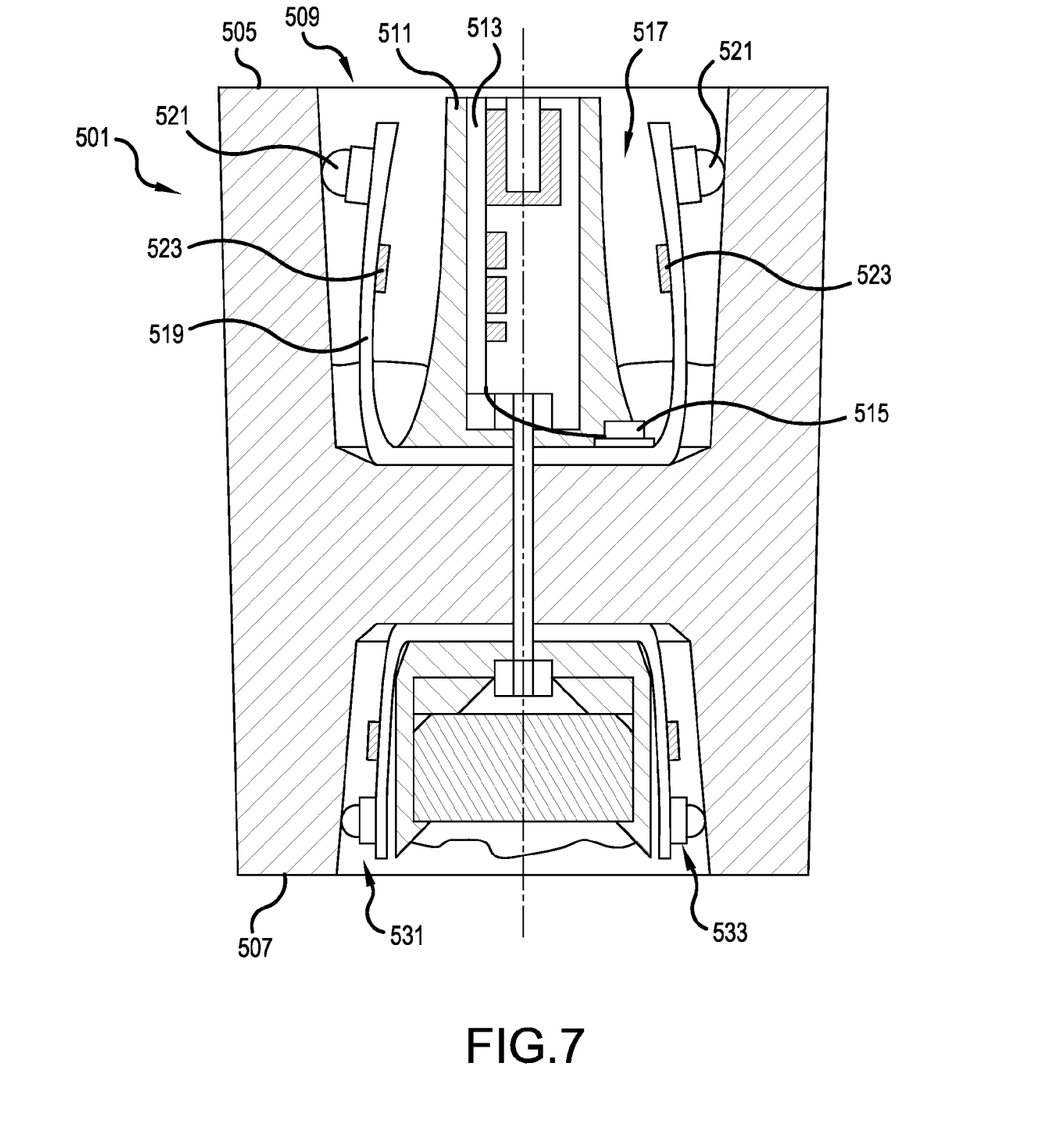
FIG. 7 shows a roller body according to a seventh embodiment of the present teachings in the form of a tapered roller.

A tapered roller 501 is illustrated in the FIG. 7 as another exemplary embodiment of the present teachings. Again, a retainer 511 with a circuit board 513 is disposed in a bore 509. The circuit board 513 is disposed in the retainer 511. The circuit board 513 is connected with a vibration sensor 515 in a manner analogous to the exemplary embodiment of the FIG. 4. The vibration sensor 515 detects vibrations of the tapered roller 501 during the operation.

Another sensor 517 is disposed in the bore 509 outside of the retainer 511 and is comprised of a U-shaped flexible measuring strip 519, which is in mechanical contact with the inner surface of the bore 509 via two contact elements 521. A strain sensor 523 is disposed on each end of the inner surface of the measuring strip 519. Even the smallest of distortions of the measuring strips 519, which result from changing loads on the tapered roller 501, can be detected by the strain sensors 523. The sensor 517 is thus preferably configured to measure the load on the tapered roller 501, e.g., the load in or on the axial end portion near the end face 505.

A functionally-comparable sensor 533 may also be disposed in the opposite bore 531 in order to measure the load on the end portion near the end face 507. The sensors 517 and 533 are likewise connected with the circuit board 513 and the electronics located thereon.

Figure 8:
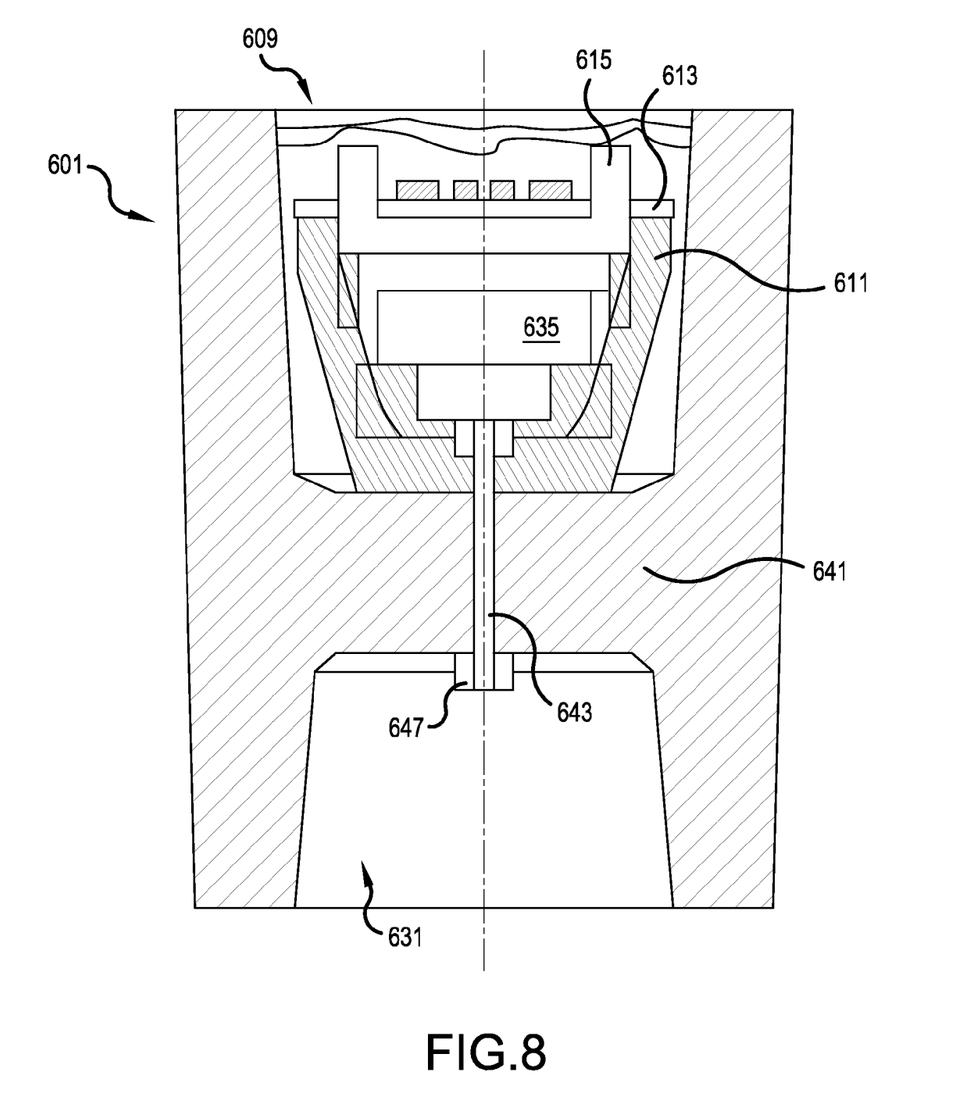
FIG. 8 shows a roller body according to a eighth embodiment of the present teachings in the form of a tapered roller.

A tapered roller 601 is illustrated in the FIG. 8 as another exemplary embodiment of the present teachings. It has two bores 609 and 631. A retainer 611 is disposed in the bore 609. A circuit board 613 is disposed on an end side of the retainer 611. Analogous to the previous exemplary embodiment, sensors and electronic components are disposed on the circuit board 613. The circuit board 613 is in electrical contact with a battery 635, which is also disposed inside the retainer 611. The retainer 611 is connected with an intermediate portion 641 by a screw 643. The bore 631 serves only to accommodate a nut 647 for attaching the screw 643. A magnetic core 615 is disposed in the area of the circuit board 613.

REFERENCE NUMBER LIST 1 cylindrical roller
3 track (race) surface
5 end face
7 end face
9 bore
11 retainer
12 stabilizing plate
13 retaining piece
15 snap-on elements
17 retainer holder
19 circuit board
21 screws
22 sensor
23 projections
25 antenna unit
27 electronic components
29 plastic
51 cylindrical roller
53 retaining piece
101 tapered roller
103 track (race) surface
105 end face
107 end face
109 bore
111 retainer
113 circuit board
115 sensor
117 electronic components
119 antenna
121 elastic material 131 bore
133 retainer
135 battery
137 snap-on elements
139 elastic material
141 intermediate portion
143 bore
145 screw
147 nuts
201 tapered roller
203 bore
211 retainer
213 circuit board
215 sensor
217 electronic components
219 antenna
221 plastic
223 protrusion
241 intermediate portion
243 circuit board
245 connection wire
301 tapered roller
309 bore
311 retainer
313 circuit board
315 snap-on elements
319 antenna
321 elastic material
331 plastic
401 tapered roller
411 retainer
413 circuit board
421 cover
435 battery
437 cover
501 tapered roller
505 end face
507 end face
509 bore
511 retainer
513 circuit board
515 vibration sensor
517 sensor
519 measuring strip
521 contact elements
523 strain sensor
531 bore
533 sensor
601 tapered roller
609 bore
611 retainer
613 circuit board
615 magnetic core
631 bore
635 battery
641 intermediate portion
643 screw
647 nut

The invention claimed is:

1. A roller body configured for use in a roller bearing comprising:
at least one cavity extending from an end face of the roller body,
at least one retaining element disposed in the cavity,
at least one sensor unit disposed on or in the retaining element, wherein the at least one retaining element has at least one recess, the sensor unit being retained in the recess; and
a first elastic material at least partly filling the recess and at least partially surrounding the at least one sensor unit.

2. The roller body according to claim 1, wherein the retaining element is fixedly connected with the roller body for rotation therewith.

3. The roller body according to claim 2, wherein a second elastic material is disposed in at least one of the cavity and the recess and at least partially surrounds the retaining element.

4. The roller body according to claim 3, wherein the sensor unit includes an electronic circuit having at least one sensor element.

5. The roller body according to claim 4, wherein the sensor unit includes at least one signal transmitting element.

6. The roller body according to claim 5, further comprising:
a second cavity extending from another end face of the roller body,
an intermediate portion disposed between the first and second cavities and being comprised of the same material as the rest of the roller body,
a passage extending through the intermediate portion, and
an attachment element disposed at least partially in the passage and being connected with the retaining element.

7. The roller body according to claim 6, further comprising:
a second retaining element disposed in the second cavity, and
a power supply unit retained by the second retaining element, the power supply unit being connected with the sensor unit.

8. The roller body according to claim 7, wherein the second retaining element is connected with the attachment element.

9. The roller body according to claim 8, further comprising an electrical connecting element disposed in the passage and connecting the sensor unit with the power supply unit.

10. The roller body according to claim 9, further comprising at least one additional sensor unit disposed in the second cavity.

11. The roller body according to claim 1, further comprising a second elastic material disposed in the cavity and at least partially surrounding the at least one retaining element.

12. The roller body according to claim 1, wherein the sensor unit includes an electronic circuit having at least one sensor element.

13. The roller body according to claim 12, wherein the sensor unit includes at least one wireless signal transmitting element.

14. The roller body according to claim 1, further comprising:
a second cavity extending from another end face of the roller body,
an intermediate portion disposed between the first and second cavities and being comprised of the same material as the rest of the roller body,
a passage extending through the intermediate portion, and
an attachment element disposed at least partially in the passage and being connected with the retaining element.

15. The roller body according to claim 14, wherein a second retaining element is disposed in the second cavity, the second retaining element retaining a power supply unit connected with the sensor unit.

16. The roller body according to claim 15, wherein the second retaining element is connected with the attachment element.

17. The roller body according to claim 14, further comprising an electrical conductor disposed in the passage and electrically connecting the sensor unit with a power supply unit disposed in the roller body.

18. The roller body according to claim 14, further comprising at least one additional sensor unit disposed in the second cavity.

19. The roller body according to claim 1, wherein the roller body has a longitudinal axial centerline extending in the at least one cavity.

20. The roller body according to claim 1, wherein the at least one cavity has at least one longitudinal axial centerline, and wherein the at least one longitudinal axial centerline of the at least one cavity lies on a longitudinal axial centerline of the roller body.

21. The roller body according to claim 1, wherein the first elastic material comprises a body of the elastic material and wherein the at least one sensor is embedded in the body of the elastic material.

22. A rolling element for a roller bearing comprising:
a body having at least one end face,
at least one cavity defined in the body and extending from the end face,
at least one sensor disposed within the at least one cavity,
at least one retaining element disposed in the cavity, wherein the at least one retaining element has at least one recess and the sensor is retained in the recess; and
an elastic material at least partly filling the recess and at least partially surrounding and protecting the sensor.

23. The rolling element of claim 22, further comprising an antenna configured to wirelesly transmit data to an external device, the antenna being in electrical communication with the at least one sensor and being disposed within the at least one cavity.

24. The roller body according to claim 22, wherein the elastic material comprises a body of the elastic material and wherein the at least one sensor is embedded in the body of the elastic material.

25. A roller body configured for use in a roller bearing comprising:
at least one cavity extending into the roller body from an end face of the roller body,
at least one retaining element fixedly mounted in the cavity for rotation with the roller body,
at least one sensor unit disposed inside the cavity on or in the retaining element, and
an elastic material at least partially surrounding the at least one sensor unit.

26. The roller body according to claim 25, wherein the at least one sensor unit is embedded in the elastic material.

* * * * *